(12) United States Patent
Nathan

(10) Patent No.: US 12,202,720 B2
(45) Date of Patent: Jan. 21, 2025

(54) MECHANISM FOR DISPENSING FLUIDS WITH COMPRESSED AIR

(71) Applicant: William F. Nathan, Whitewater, WI (US)

(72) Inventor: William F. Nathan, Whitewater, WI (US)

( * ) Notice: Subject to any disclaimer, the term of this patent is extended or adjusted under 35 U.S.C. 154(b) by 382 days.

(21) Appl. No.: 17/706,826

(22) Filed: Mar. 29, 2022

(65) Prior Publication Data

US 2023/0312328 A1 Oct. 5, 2023

(51) Int. Cl.
*G05D 9/12* (2006.01)
*B67D 3/00* (2006.01)

(52) U.S. Cl.
CPC ............. *B67D 3/0003* (2013.01); *G05D 9/12* (2013.01)

(58) Field of Classification Search
CPC ........ B60K 15/063; B60K 2015/03118; B60K 2015/03138; B60K 2015/03144; B60K 2015/03131; C02F 2209/42; G05D 9/12; F16K 37/005; B67D 7/061; B67D 7/78; B67D 3/0093; Y10T 137/3115
See application file for complete search history.

(56) References Cited

U.S. PATENT DOCUMENTS

| | | | | |
|---|---|---|---|---|
| 4,576,043 A * | 3/1986 | Nguyen | ..................... | G01F 1/74 73/195 |
| 4,601,409 A * | 7/1986 | DiRegolo | ............ | B67D 7/0283 137/413 |
| 5,099,697 A * | 3/1992 | Agar | ......................... | G01F 1/74 73/195 |
| 5,383,574 A * | 1/1995 | Raphael | ................ | G01F 11/284 222/64 |
| 5,591,922 A * | 1/1997 | Segeral | ..................... | G01F 1/74 73/861.04 |
| 6,098,843 A * | 8/2000 | Soberanis | ............ | B67D 7/0238 222/53 |
| 7,637,152 B2 * | 12/2009 | Ushigusa | ................... | G01F 1/42 137/596.17 |
| 2004/0182172 A1* | 9/2004 | Richards | ................... | G01F 1/74 73/861.04 |
| 2008/0135587 A1 | 6/2008 | Monti | | |

* cited by examiner

*Primary Examiner* — Paul R Durand
*Assistant Examiner* — Randall A Gruby
(74) *Attorney, Agent, or Firm* — James Earl Lowe, Jr.

(57) ABSTRACT

A mechanism for dispensing fluids to a manufacturing process includes a vented fluid reservoir, a pressure chamber, and a pump in fluid communication with the vented fluid reservoir and the pressure chamber for pumping fluid from the vented fluid reservoir to one end of the pressure chamber. The mechanism also includes an air compressor for supplying air under pressure to an opposite end of the pressure chamber, a fluid level sensor responsive to the level of fluid in the pressure chamber, and a controller connected to the fluid level sensor and to the pump. The mechanism also includes a pressure chamber outlet, and a fluid dispensing component. The fluid dispensing component includes a first venturi at an inlet into a supply chamber, a second venturi at an outlet from the supply chamber, and an electrically controlled valve in fluid communication with the second venturi.

6 Claims, 5 Drawing Sheets

MECHANISM FOR DISPENSING FLUIDS WITH COMPRESSED AIR

BACKGROUND

1. Field of the Invention

This disclosure pertains to the dispensing and delivery of fluids, especially fluids with a greater viscosity than water, using compressed air.

2. Description of the Prior Art

Certain manufacturing processes require the use of fluids of various viscosities. For example, viscous fluids such as hand creams need to be dispensed into containers for retail purchase. Known systems for dispensing fluids with a viscosity greater than water usually rely on gravity feed systems or piston style fluid pumping. What is needed is a simple and accurate and low maintenance way to dispense such fluids.

SUMMARY

Disclosed is a mechanism for dispensing fluids to a manufacturing process includes a vented fluid reservoir, a pressure chamber, and a pump in fluid communication with the vented fluid reservoir and the pressure chamber for pumping fluid from the vented fluid reservoir to one end of the pressure chamber. The mechanism also includes an air compressor for supplying air under pressure to an opposite end of the pressure chamber, a fluid level sensor responsive to the level of fluid in the pressure chamber, and a controller connected to the fluid level sensor and to the pump. The mechanism also includes a pressure chamber outlet, and a fluid dispensing component. The fluid dispensing component includes a first venturi at an inlet into a supply chamber, a second venturi at an outlet from the supply chamber, and an electrically controlled valve in fluid communication with the second venturi.

Figure 1:
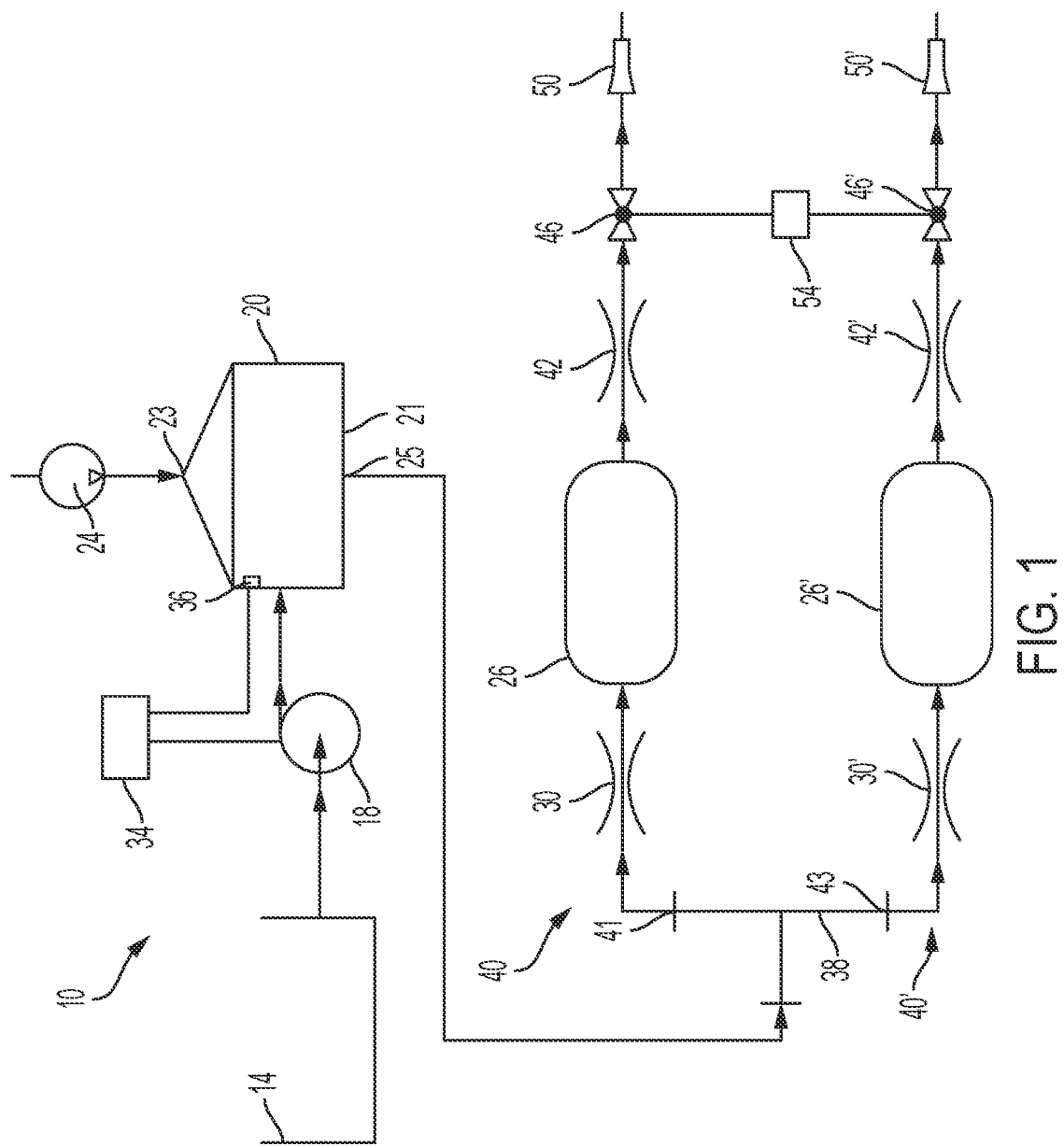
FIG. 1 is a schematic illustration of a mechanism according to this disclosure.
Figure 2:
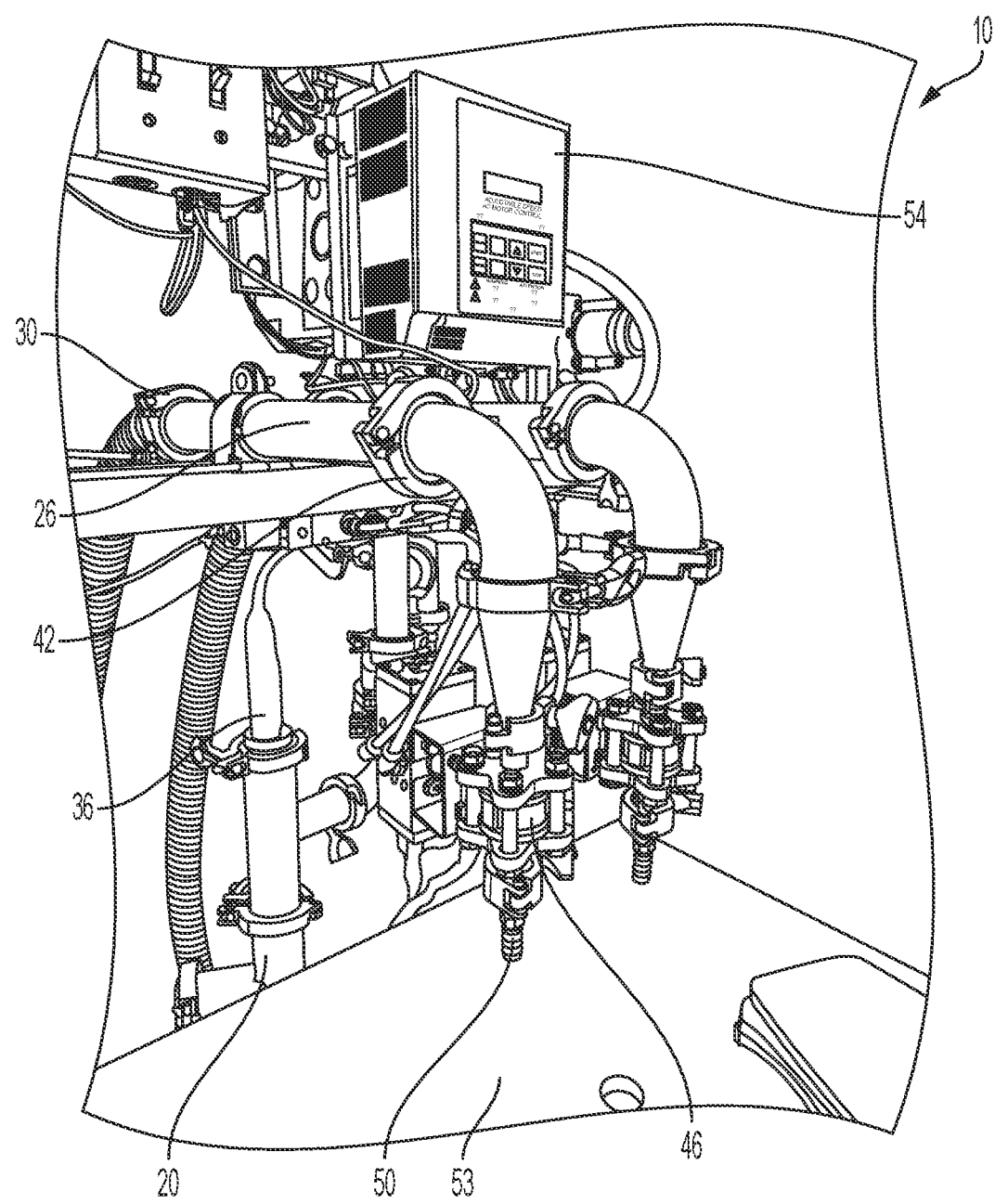
FIG. 2 is a side perspective view of a portion of a mechanism of the mechanism shown in FIG. 1 illustrating the dispensing part of the mechanism.
Figure 3:
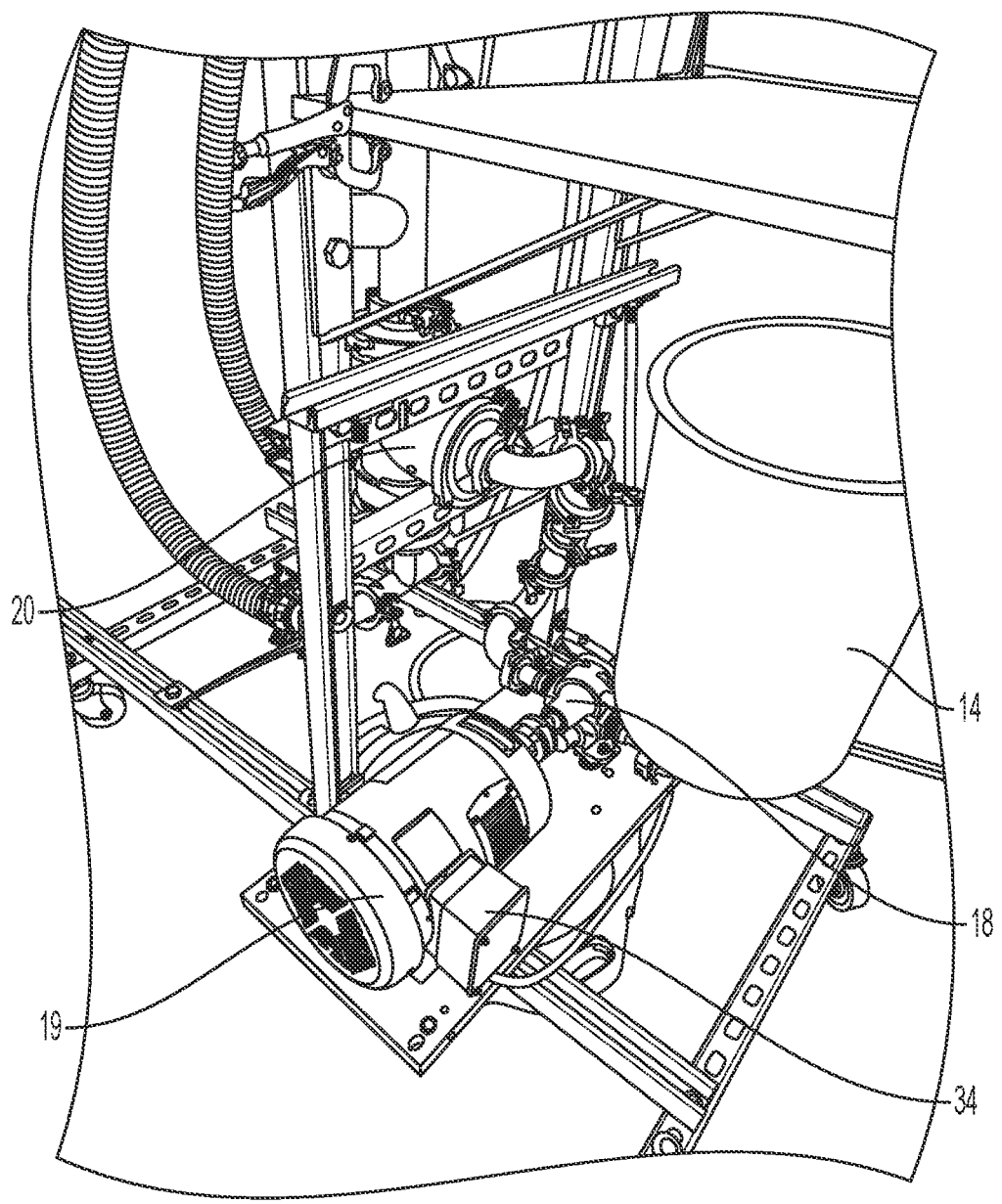
FIG. 3 is a side perspective view of a portion of the mechanism of FIG. 1 illustrating the reservoir and pump part of the mechanism.
Figure 4:
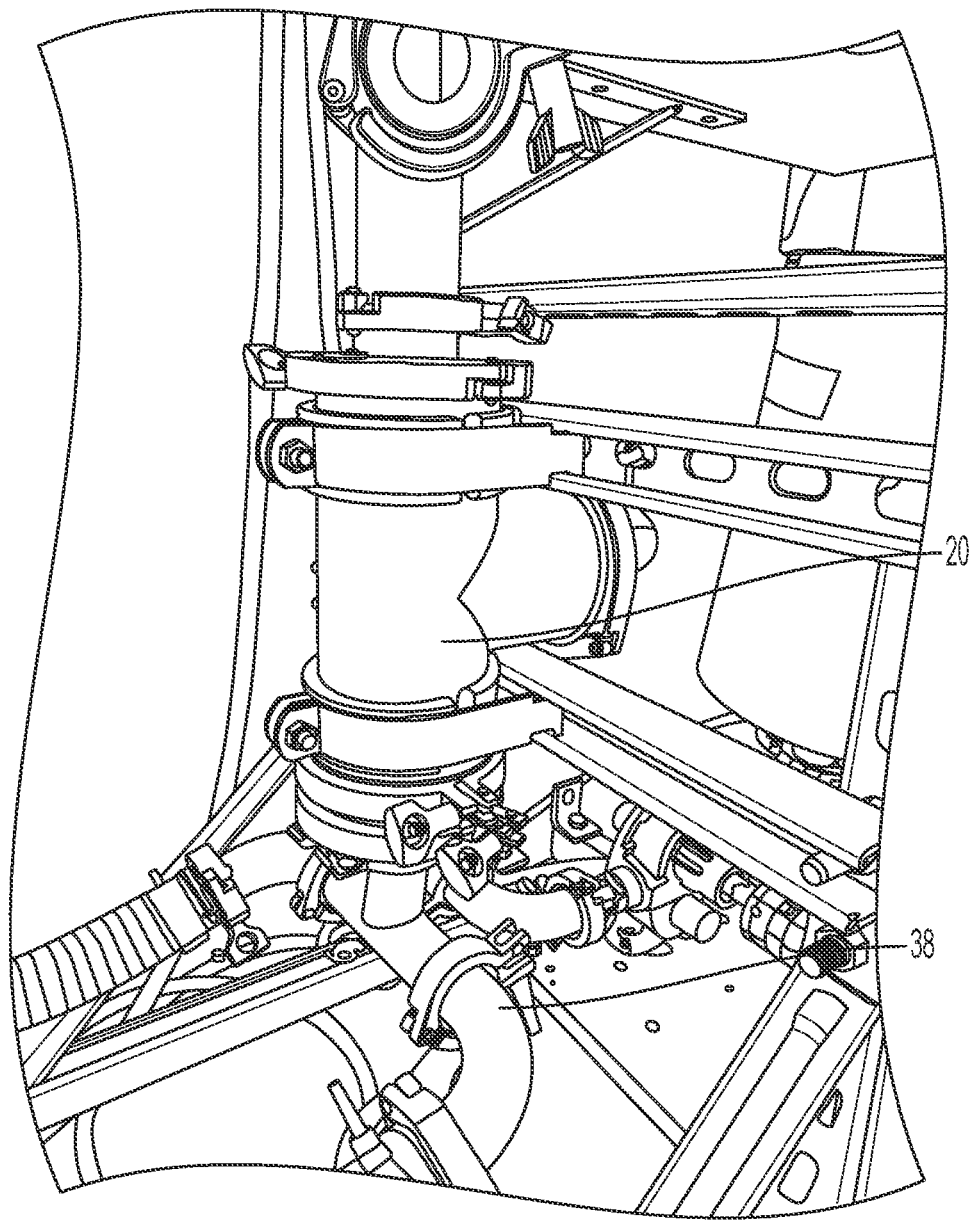
FIG. 4 is a side perspective view of a portion of the mechanism of FIG. 1 illustrating the pressure chamber and manifold part of the mechanism.
Figure 5:
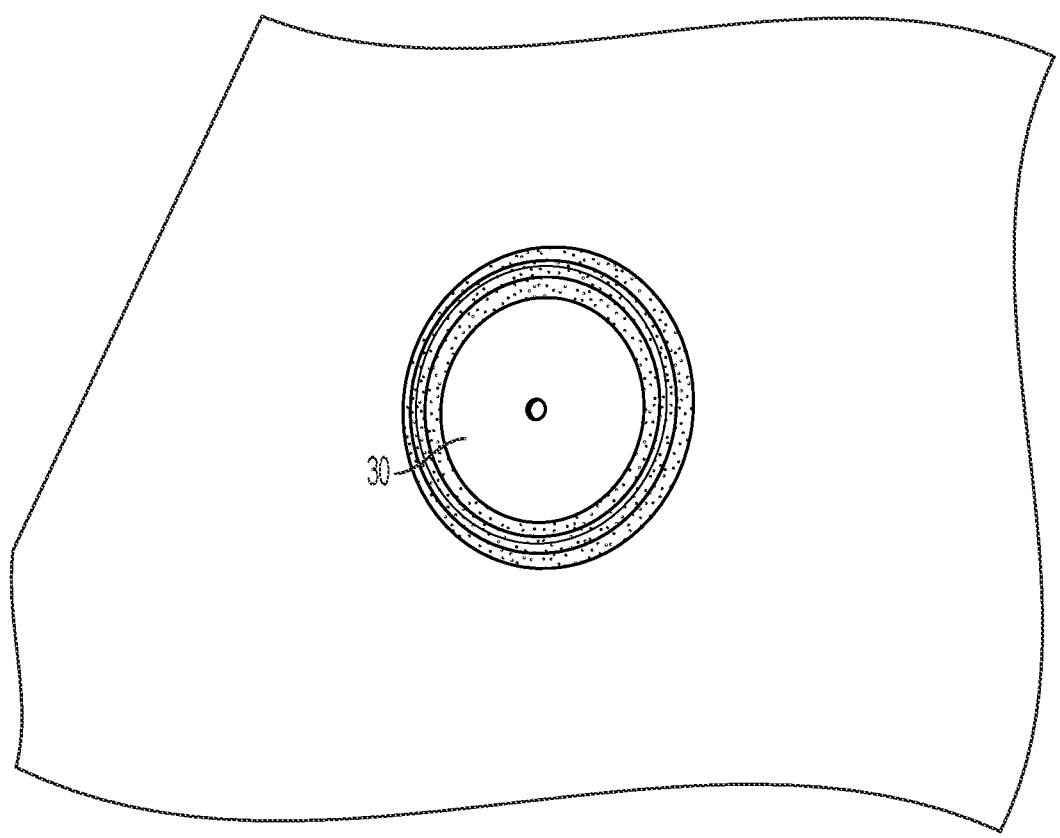
FIG. 5 is a top perspective view of an orifice plate used in the mechanism of FIG. 1.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

DESCRIPTION OF THE PREFERRED EMBODIMENT

As illustrated schematically in FIG. 1 and in one embodiment in FIGS. 2 to 5, disclosed is a mechanism 10 for dispensing fluids, especially hand creams to a manufacturing process. Fluids such as hand creams have a fluid viscosity much greater than water, and this higher viscosity presents unique challenges when designing a mechanism to accurately dispense such fluids. The disclosed mechanism 10 includes a vented fluid reservoir 14, a pressure chamber 20 having one end 21 and an opposite end 23, and a pump 18 in fluid communication with the vented fluid reservoir 14 and the pressure chamber 20 for pumping fluid from the vented fluid reservoir 14 to the one end 21 of the pressure chamber 20. The mechanism 10 also includes an air compressor 24 for supplying air under pressure to the opposite end 23 of the pressure chamber 20, a fluid level sensor 36 responsive to the level of fluid in the pressure chamber 20, and a controller 34 connected to the fluid level sensor 36 and to the pump 18 for operating the pump 18 to maintain at least a minimum fluid level in the pressure chamber 20. In the disclosed embodiment then there is a compressed air and fluid interface but in other embodiments (not shown), a floating head can be placed between the fluid and the compressed air to prevent contact between the air and fluid, if needed.

The mechanism 10 also includes a pressure chamber outlet 25 located between the one end of the pressure chamber 20 and the minimum fluid level in the pressure chamber 20, and a fluid dispensing component 40. The fluid dispensing component 40 includes a first venturi 30 at an inlet into a supply chamber 26, a second venturi 42 at an outlet from the supply chamber 26, and an electrically controlled valve 46 in fluid communication with the second venturi 42. The first venturi 30 is in fluid communication with the pressure chamber outlet 25. The fluid dispensing component 40 also includes a timer and valve control 54 for opening and closing the valve 46 at predetermined intervals to dispense a desired amount of fluid, and a nozzle 50 is in fluid communication with the electrically controlled valve 46.

More particularly, in the disclosed embodiment, the electrically controlled valve 46 is a positive shutoff valve such as a ball valve, and the first venturi 30 is an orifice plate. The second venturi 42 is also an orifice plate. The pump 18 includes an electric motor 19 and the controller 34 is connected to the electric motor 19 to operate the pump 18. The mechanism 10 further includes a manifold 38 in fluid communication between the pressure chamber outlet, the manifold having a first port 41 in fluid communication with the first venturi 30 and a second port 43 adapted to be connected to another fluid dispensing component 40'. More particularly, the disclosed mechanism 10 further includes a second fluid dispensing component 40' in fluid communication with the second port 43. The mechanism 10 can thus be used with one nozzle and without a manifold for dispensing fluids, or with two nozzles 50 and 50' or more (not shown) for dispensing fluids simultaneously, depending on the needs of the manufacturing process.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

The invention claimed is:

1. A mechanism for dispensing fluids, the mechanism including a vented fluid reservoir, a pressure chamber having one end and an opposite end, a pump in fluid communication with the vented fluid reservoir and the pressure chamber for pumping fluid from the vented fluid reservoir to the one end of the pressure chamber, an air compressor for supplying air under pressure to the opposite end of the pressure chamber, a fluid level sensor responsive to the level of fluid in the pressure chamber, a controller connected to the fluid level sensor and to the pump for operating the pump to maintain at least a minimum fluid level in the pressure chamber, a pressure chamber outlet located between the one end of the pressure chamber and the minimum fluid level in the pressure chamber, and a fluid dispensing component including a first venturi at an inlet into a supply chamber, the first venturi being in fluid communication with the pressure chamber outlet, a second venturi at an outlet from the supply chamber, an electrically controlled valve in fluid communication with the second venturi, a timer and valve control for opening and closing the valve at predetermined intervals to dispense a desired amount of fluid, and a nozzle in fluid communication with the electrically controlled valve.

2. The mechanism according to claim 1 wherein the electrically controlled valve is a ball valve.

3. The mechanism according to claim 1 wherein the first venturi is an orifice plate and the second venturi is an orifice plate.

4. The mechanism according to claim 1 wherein the pump includes an electric motor and the controller is connected to the electric motor to operate the pump.

5. The mechanism according to claim 1 wherein the mechanism further includes a manifold in fluid communication with the pressure chamber outlet, the manifold having a first port in fluid communication with the first venturi and a second port adapted to be connected to another fluid dispensing component.

6. The mechanism according to claim 1 wherein the mechanism further includes a second fluid dispensing component in fluid communication with the second port.

* * * * *